(12) United States Patent
Mochizuki et al.

(10) Patent No.: US 7,588,010 B2
(45) Date of Patent: Sep. 15, 2009

(54) POWER UNIT FOR A VEHICLE

(75) Inventors: Shigehiro Mochizuki, Shizuoka-ken (JP); Kazutaka Fukuda, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 232 days.

(21) Appl. No.: 11/735,933

(22) Filed: Apr. 16, 2007

(65) Prior Publication Data

US 2008/0251046 A1 Oct. 16, 2008

(51) Int. Cl.
*F02B 75/22* (2006.01)
*F02B 75/00* (2006.01)

(52) U.S. Cl. .................. 123/195 R; 123/195 HC; 123/195 AC

(58) Field of Classification Search ............. 123/195 R, 123/195 HC, 195 AC
See application file for complete search history.

(56) References Cited

U.S. PATENT DOCUMENTS

| | | | |
|---|---|---|---|
| 2,218,332 A | 10/1940 | Fowler | |
| 2,469,117 A | 5/1949 | Kiekhaefer | |
| 3,561,416 A | 2/1971 | Kiekhaefer | |
| 3,613,816 A | 10/1971 | Gutbrod | |
| 4,655,309 A | 4/1987 | Imaizumi et al. | |
| 4,685,428 A * | 8/1987 | Inagaki et al. ............... | 123/52.1 |
| 4,869,332 A | 9/1989 | Fujita et al. | |
| 5,012,775 A * | 5/1991 | Oike ........................ | 123/192.2 |
| 5,024,113 A | 6/1991 | Ito et al. | |
| 5,699,872 A | 12/1997 | Miyakawa et al. | |
| 6,632,144 B1 | 10/2003 | Narita et al. | |
| 6,712,172 B2 | 3/2004 | Inagaki et al. | |
| 6,799,485 B1 | 10/2004 | Kawamoto et al. | |
| 2003/0005905 A1 | 1/2003 | Matsuto et al. | |
| 2003/0217724 A1* | 11/2003 | Hattori et al. ............ | 123/195 R |
| 2004/0216942 A1 | 11/2004 | Tanaka et al. | |
| 2005/0173177 A1 | 8/2005 | Smith et al. | |

FOREIGN PATENT DOCUMENTS

| | | | |
|---|---|---|---|
| DE | 4001437 | | 7/1991 |
| JP | 60116825 A | * | 6/1985 |
| JP | 02144279 A | * | 6/1990 |
| JP | 2004278453 A | * | 10/2004 |

* cited by examiner

*Primary Examiner*—Noah Kamen
(74) *Attorney, Agent, or Firm*—Knobbe, Martens, Olson & Bear, LLP

(57) ABSTRACT

A power unit for a vehicle comprises an engine and a transmission assembly. The engine includes a crank shaft having a rotating mass. The transmission assembly includes a drive shaft having a first drive gear and being connected to the crank shaft through a first transmission mechanism, and a driven shaft connected to the drive shaft through a driven gear that meshes with the first drive gear. With the power unit oriented such that the crank shaft is substantially horizontal, at least a portion of the transmission assembly is positioned within a region extending below a swept area of the rotating mass.

20 Claims, 10 Drawing Sheets

[Fig. 1]
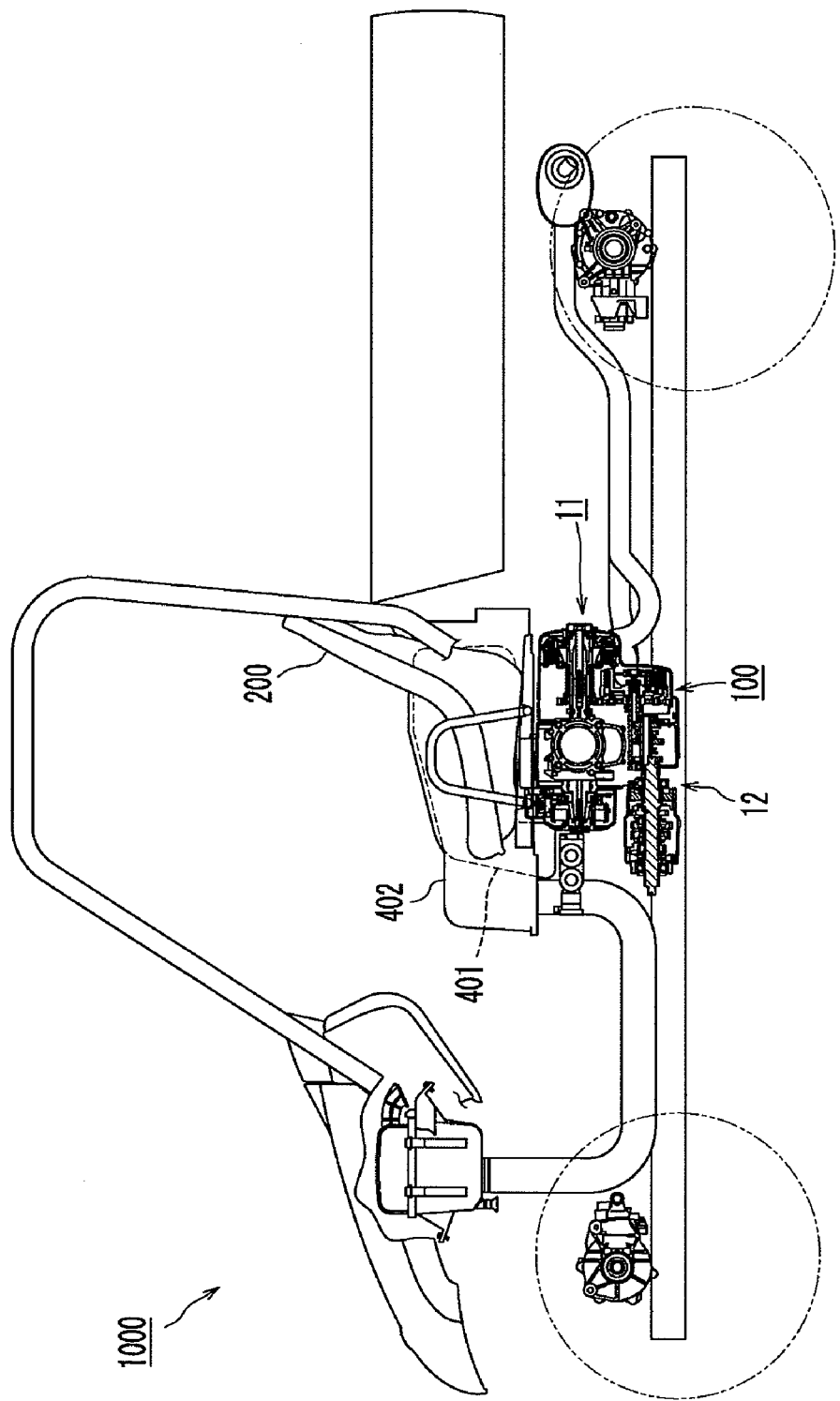

[Fig. 2]
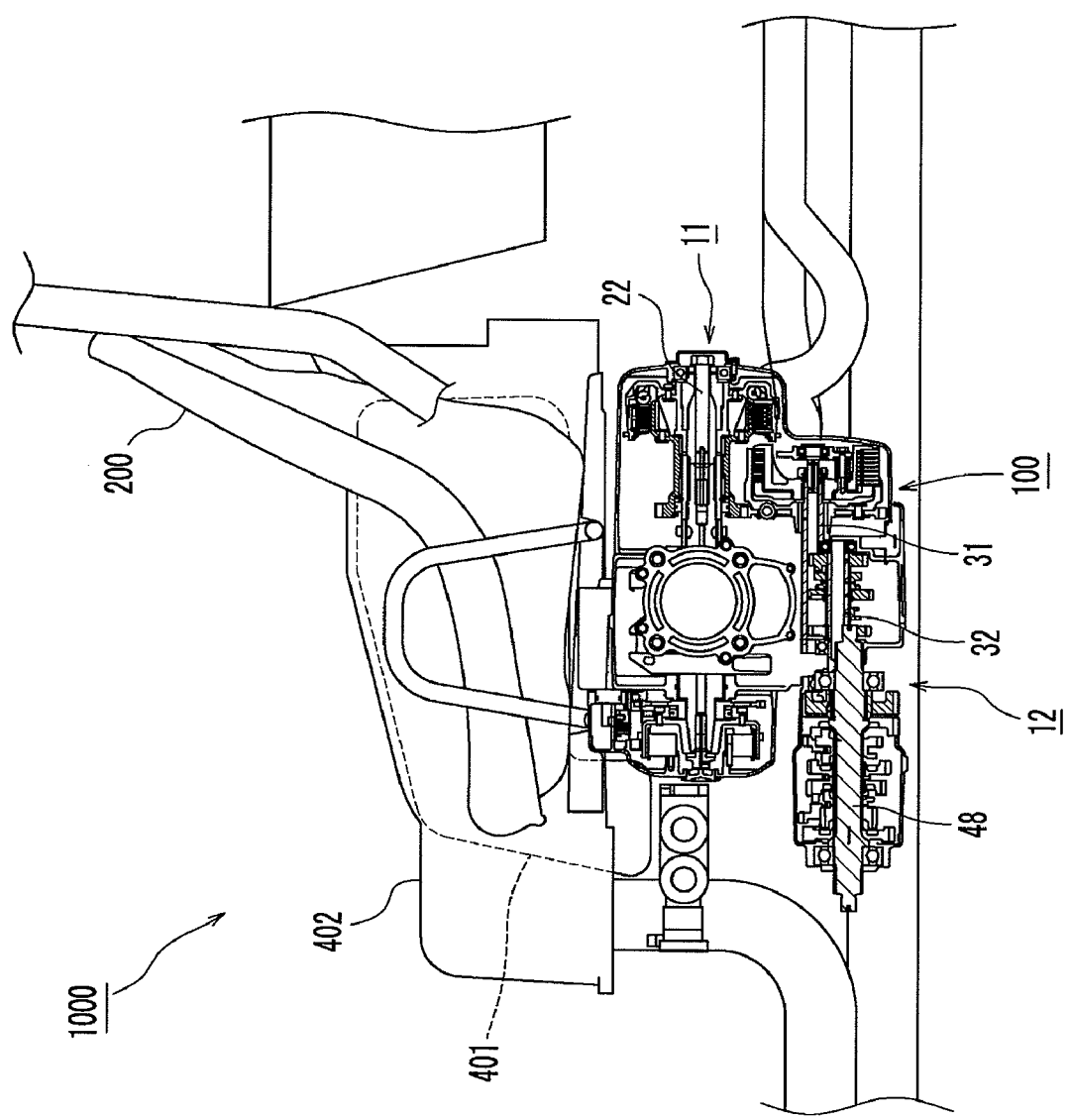

[Fig. 3]
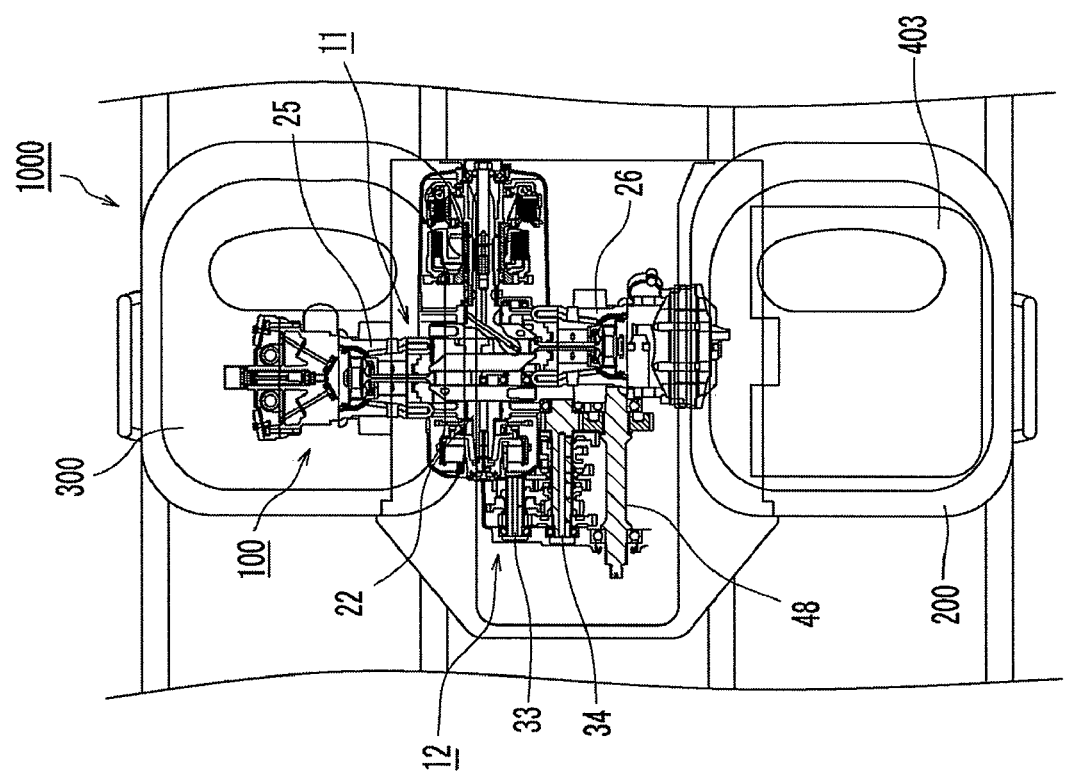

[Fig. 4]
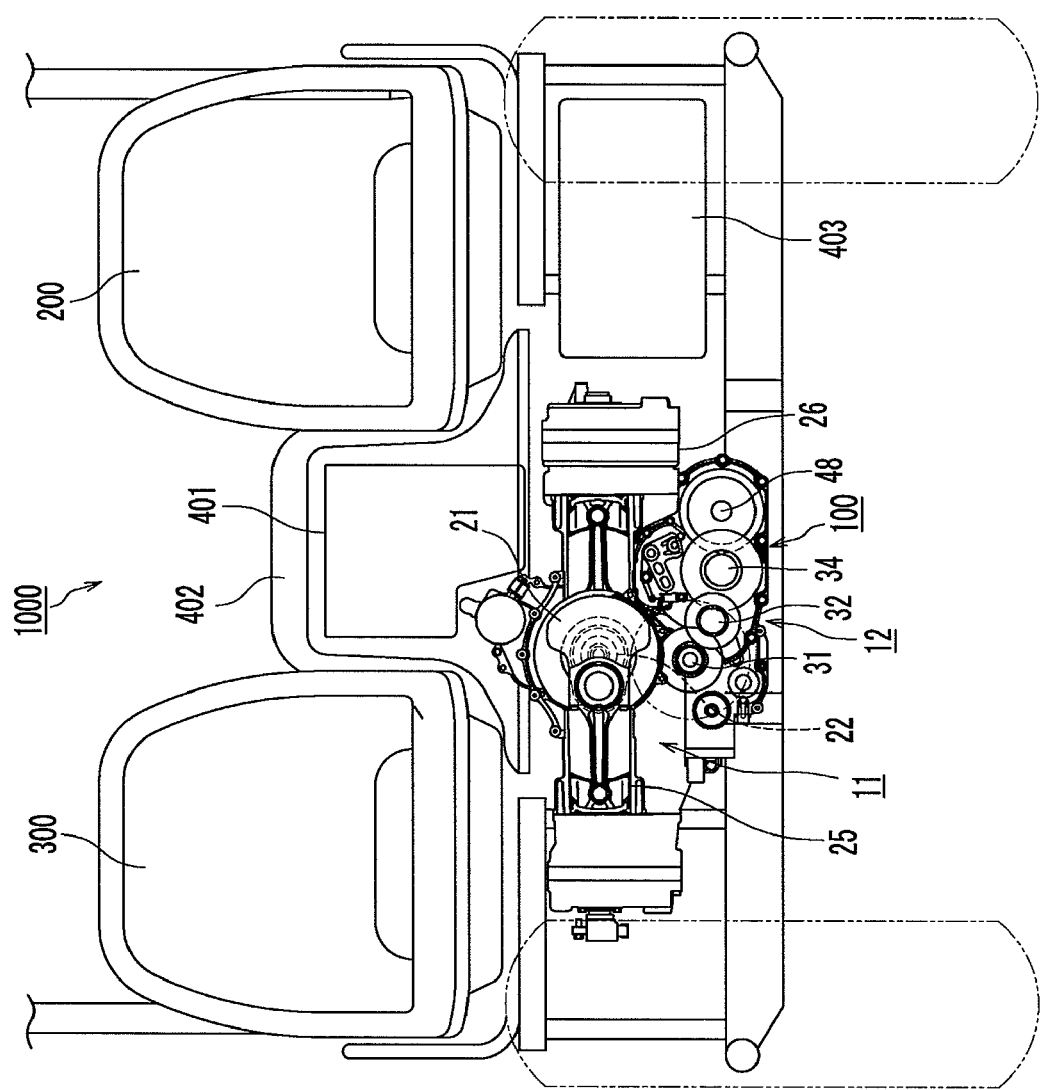

[Fig. 5]
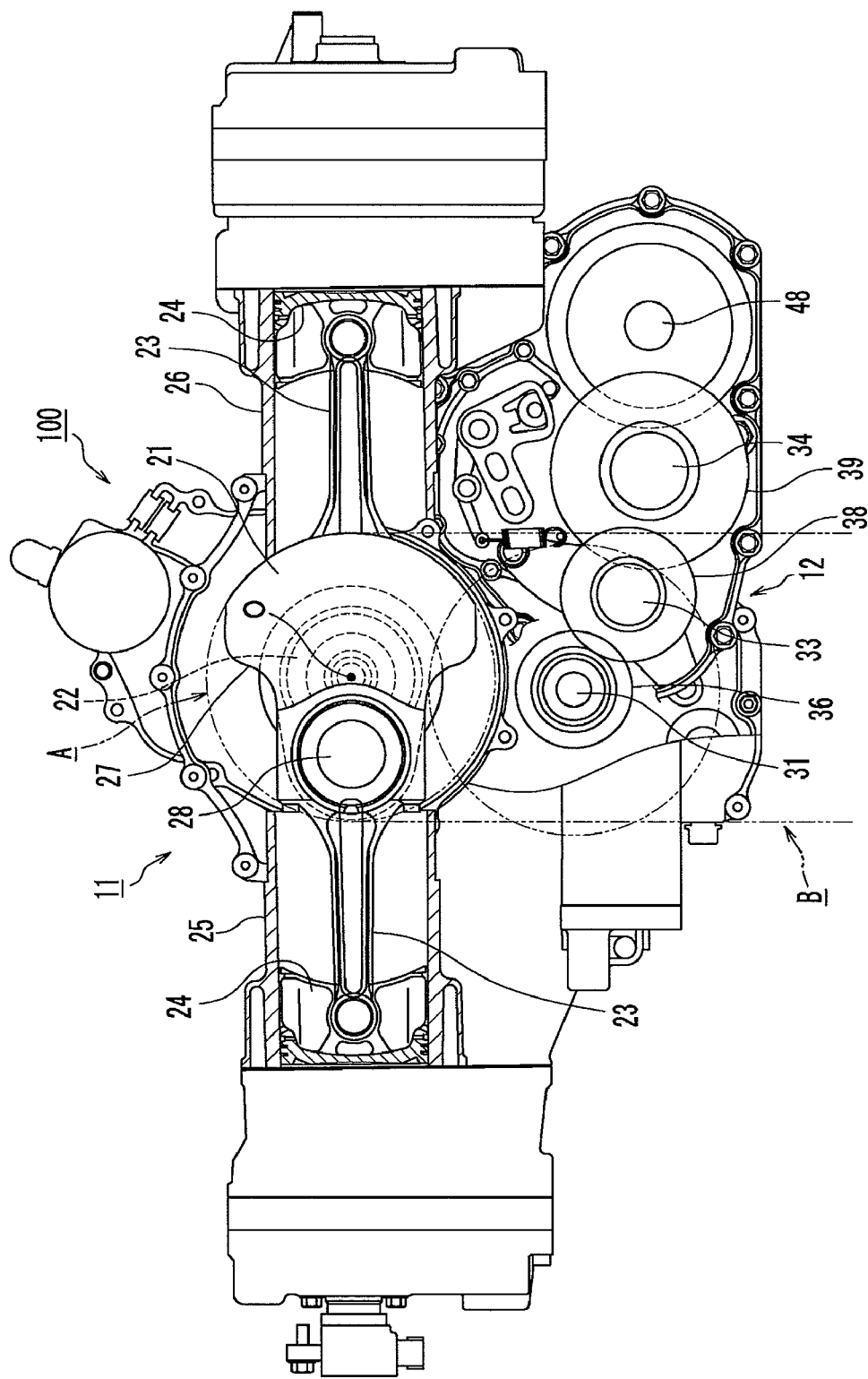

[Fig. 6]
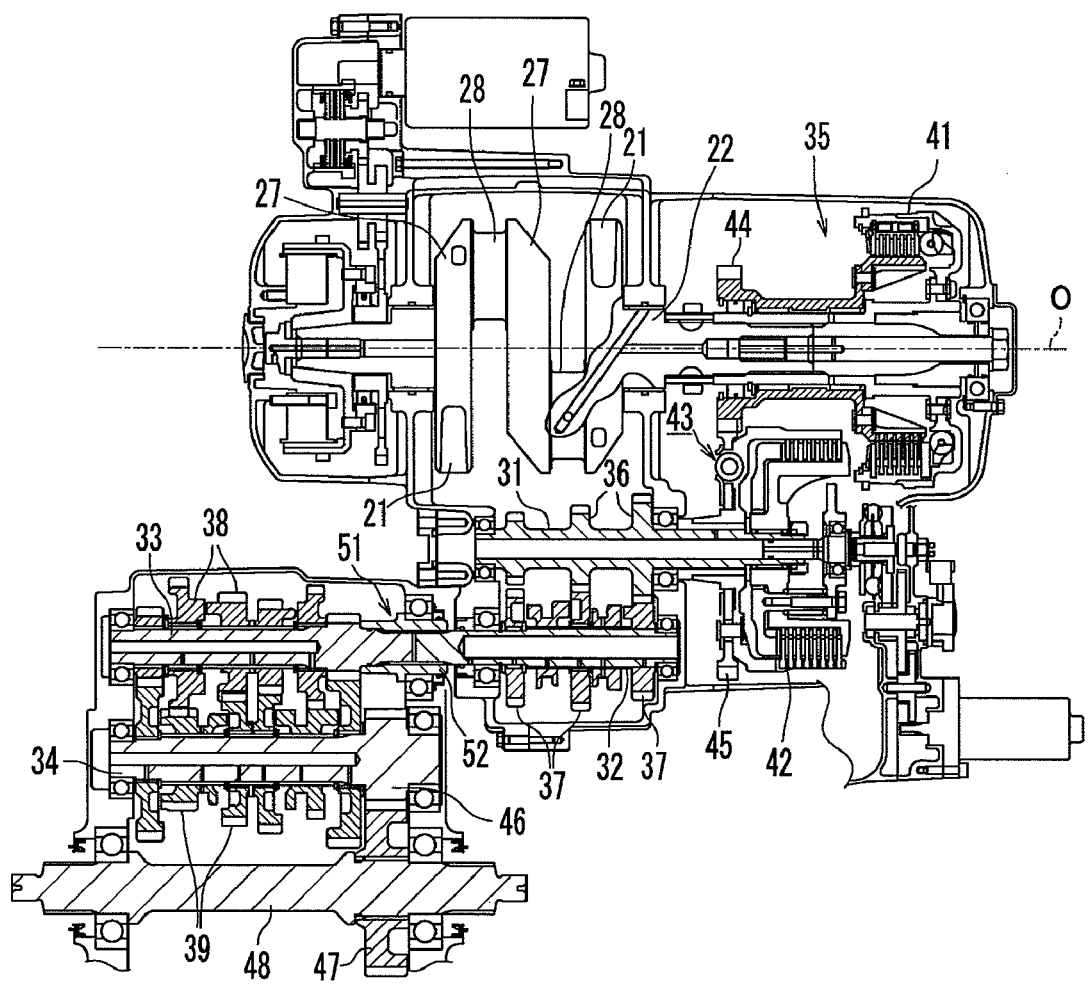

[Fig. 7]
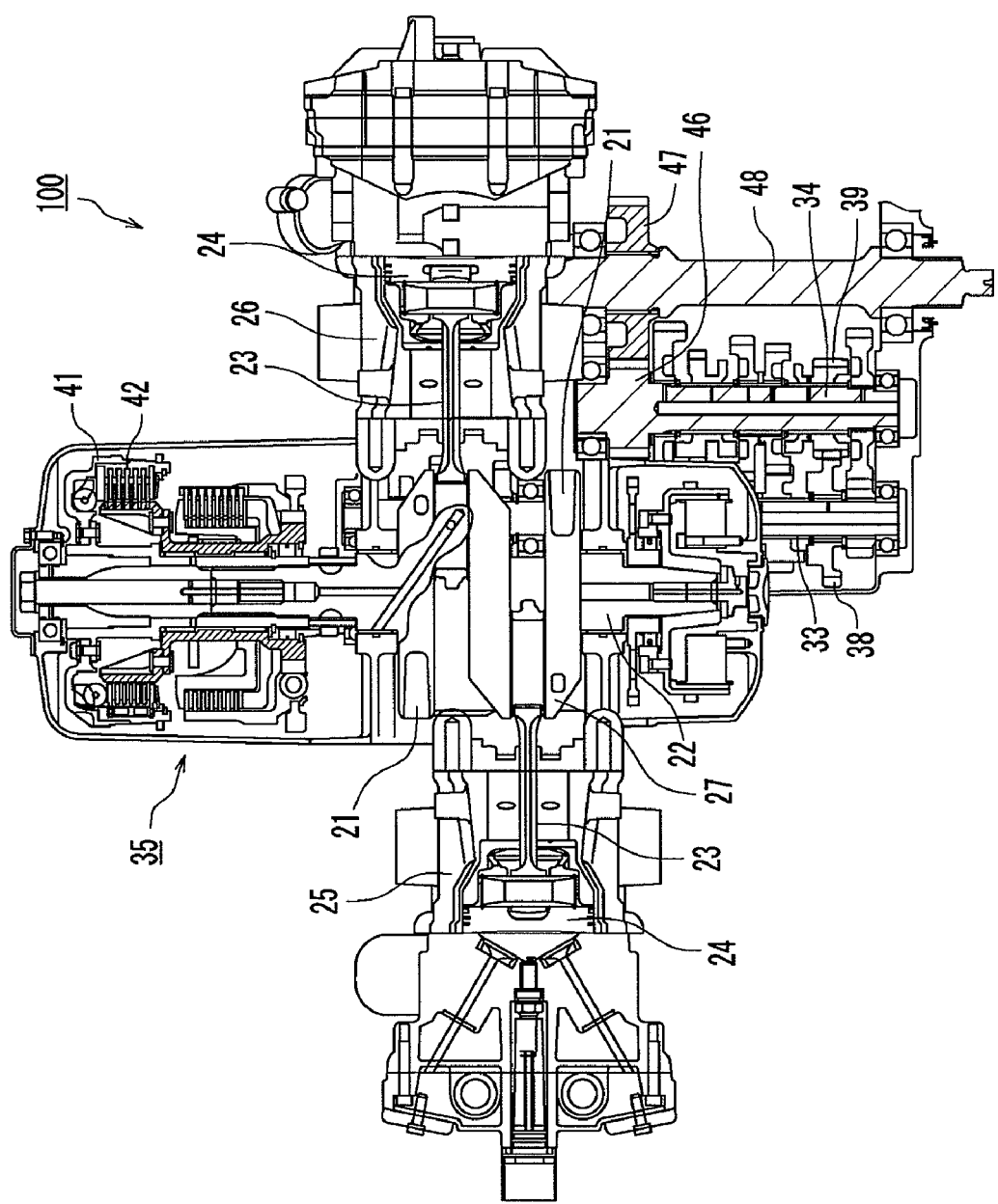

[Fig. 8]
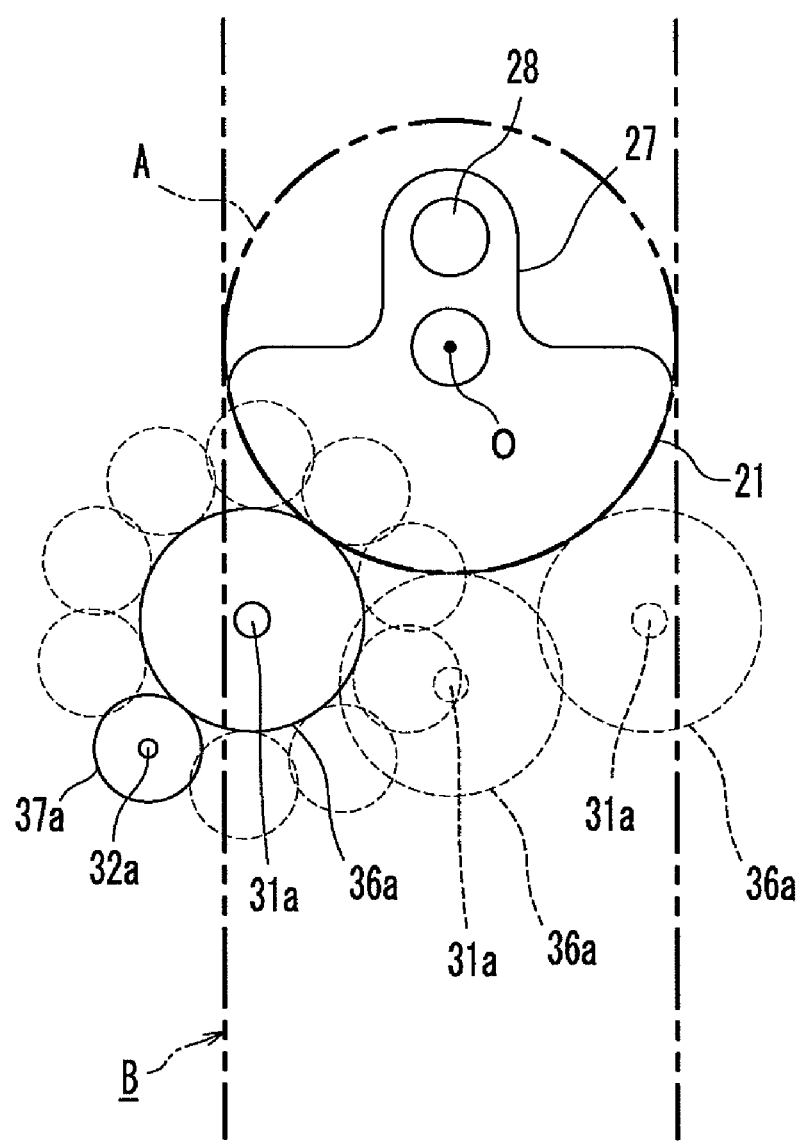

[Fig. 9]
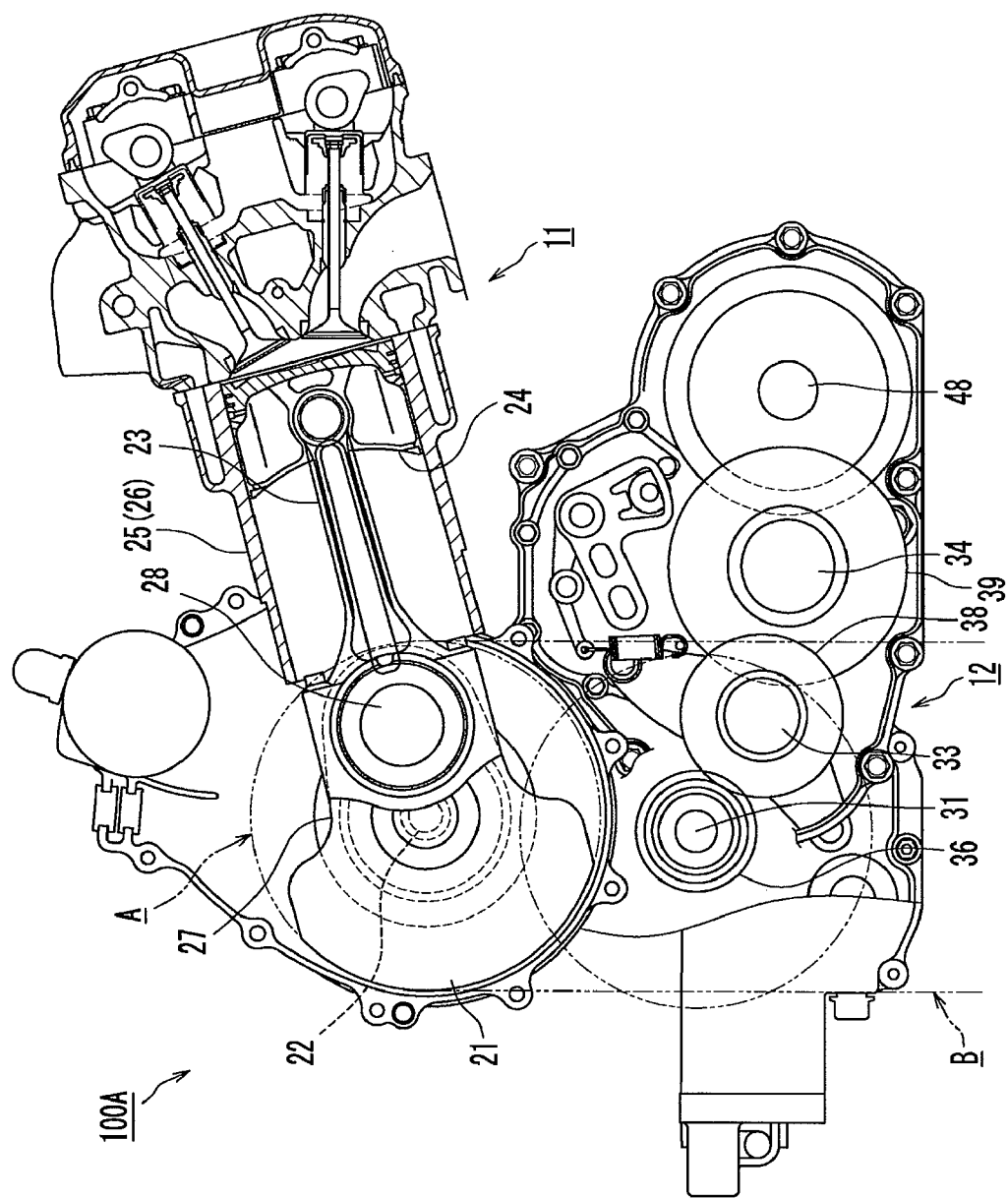

[Fig. 10]
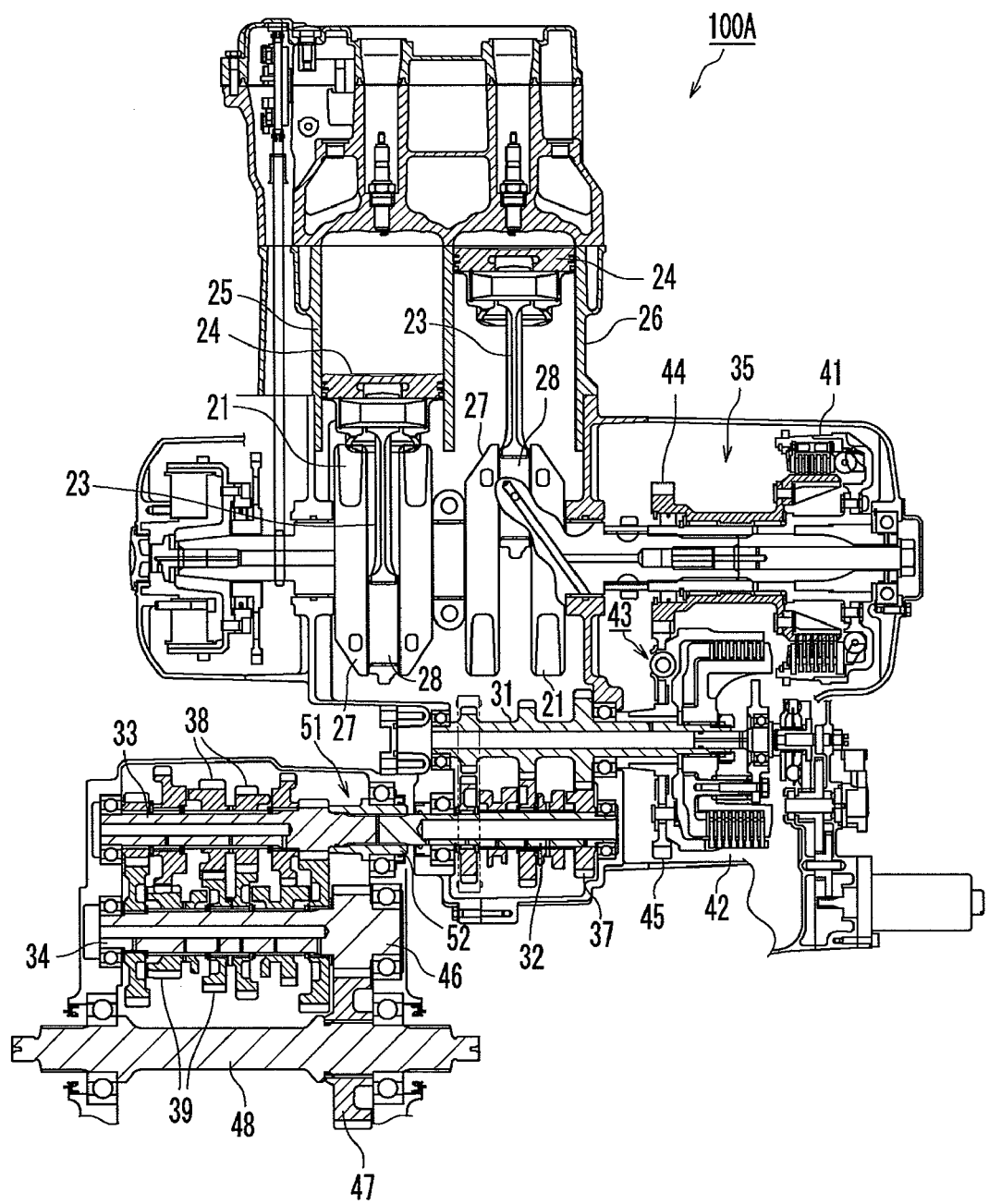

POWER UNIT FOR A VEHICLE

BACKGROUND OF THE INVENTION

1. Field of the Invention

The present invention relates to a power unit for a vehicle, and more particularly, to a power unit for a small-sized utility vehicle.

2. Description of the Related Art

A small-sized utility vehicle is disclosed in, for example, United States Patent Application Publication No. 2005/0173177, published Aug. 11, 2005 and entitled "Power Train for a Utility Vehicle." A small-sized utility vehicle, such at the vehicle disclosed in the aforementioned publication, includes a vehicle body having a relatively simple vehicle frame structure and wheels mounted to respective front, rear, left and right corners of the vehicle body. A power unit, such as an engine, a transmission assembly, etc. is arranged in a space extending from a center of the vehicle body to between the rear wheels of the vehicle. Seats and a load-carrying platform are mounted above the space in which the power unit is arranged. Such a small-sized utility vehicle has become popular for use in various applications, such as in agricultural settings, operation on rough terrain, and the like.

SUMMARY OF THE INVENTION

A power unit having certain features, aspects and advantages of the present invention includes an engine and a transmission assembly operatively coupled to the engine. The engine includes a crank shaft having a counterweight. With the power unit oriented such that the crank shaft is substantially horizontal, at least a portion of the transmission assembly is positioned within a region extending below the swept area of the counterweight.

An aspect of a preferred embodiment involves a power unit as described above, wherein the engine includes a connecting rod connected to a crank shaft, a piston connected to the connecting rod, and a cylinder, which supports the piston for reciprocating movement. An axis of the cylinder is inclined from the vertical direction. In one arrangement, an axis of the cylinder is inclined in the range of about 45 to 90 degrees from the vertical direction. More preferably, an axis of the cylinder may be inclined in the range of about 70 to 90 degrees from the vertical direction.

Another aspect of a preferred embodiment involves the engine having two or more cylinders, wherein the cylinders are opposed to one another with the crank shaft therebetween and the axes of the cylinders are arranged to be substantially horizontal. In another arrangement, the two or more cylinders are arranged on one side of the crank shaft and the axes of the respective cylinders may be inclined within the range of about 70 to 90 degrees from the vertical direction.

Yet another aspect of a preferred embodiment involves a power unit as described above, in which the transmission assembly includes a drive shaft having a drive gear and being connected to the crank shaft through a first transmission mechanism, and a driven shaft connected to the drive shaft through a driven gear, which meshes with the drive gear. In such an arrangement, preferably, at least a portion of the drive shaft or the driven shaft is positioned within a region extending below the swept area of the counterweight.

Still a further aspect of a preferred embodiment involves a power unit as described above, in which the transmission assembly includes a drive shaft having a drive gear and being connected to a crank shaft through a first transmission mechanism, and a driven shaft connected to the drive shaft through a driven gear that meshes with the drive gear. In such an arrangement, preferably, at least a portion of both the drive shaft and the driven shaft are positioned within a region extending below the swept area of the counterweight or a region extending below a cylinder of the engine.

In an arrangement of a power unit as described above, at least a portion of both the drive shaft and the driven shaft may be positioned within a region extending below the swept area of the countershaft. In an arrangement of a power unit as described above, the drive shaft and the driven shaft may be positioned substantially perpendicular to the vertical direction. In an arrangement of a power unit as described above, the drive shaft and the driven shaft may be arranged in parallel to the crank shaft.

In an arrangement of a power unit as described above, the first transmission mechanism may include a centrifugal clutch mounted to the crank shaft, a speed change operating clutch mounted to a drive shaft, and a second transmission mechanism coupling an output portion of the centrifugal clutch and an input portion of the speed change operating clutch, wherein the centrifugal clutch and the speed change operating clutch are offset from one another in an axial direction of the crank shaft.

In an arrangement of a power unit as described above, the transmission assembly may include a first drive shaft having a first drive gear and being connected to a crank shaft through a first transmission mechanism, and a first driven shaft including a first driven gear that meshes with the first drive gear, a second drive shaft having a second drive gear and being connected to the first driven shaft through a shaft connecting element such that the second drive shaft extends coaxially relative to the first driven shaft. A second driven shaft including a second driven gear that meshes with the second drive gear. In such an arrangement, at least one of the respective drive shafts and the respective driven shafts is positioned within a region extending below a swept area of the counterweight.

Another aspect of the present invention involves a power unit having an engine and a transmission assembly operatively coupled to the engine. The engine includes a crank shaft having a rotating mass. With the power unit oriented such that the crank shaft is substantially horizontal, at least a portion of the transmission assembly is positioned within a region extending below the swept area of the rotating mass.

BRIEF DESCRIPTION OF THE DRAWINGS

These and other features, aspects and advantages of the present invention are described with reference to drawings of preferred embodiments, which are intended to illustrate, but not to limit, the present invention. The drawings contain ten (10) figures.

FIG. 1 is a side view of a small-sized utility vehicle, on which a power unit having certain features, aspects and advantages of an embodiment of the present invention is mounted.

FIG. 2 is a side view of a seat portion of the small-sized utility vehicle of FIG. 1.

FIG. 3 is a plan view of the seat portion of the small-sized utility vehicle of FIG. 1.

FIG. 4 is a front view of the vehicle of FIG. 1 showing a vertical, cross section of the seat portion.

FIG. 5 is a front view of the of the power unit, including an engine and a transmission assembly.

FIG. 6 is a partial cross sectional view of the engine and transmission assembly of the power unit of FIG. 5.

FIG. 7 is a partial cross sectional, plan view of the power unit of FIG. 5.

FIG. 8 is a view illustrating a positional relationship of certain components of the power unit of FIG. 5.

FIG. 9 is a partial cross sectional, front view of a modification of the power unit of FIG. 5.

FIG. 10 is a partial cross sectional view of the power unit of FIG. 9.

DETAILED DESCRIPTION OF THE PREFERRED EMBODIMENTS

Being relatively small in size and convenient to use, a small-sized utility vehicle having a power unit arranged centrally within the vehicle body is expected to be used in various applications in the future. The present inventors have conceived a small-sized utility vehicle, in which effective use is made of the space behind a driver seat and a passenger seat such that a wide load-carrying platform may be provided in order to permit the utility vehicle to be conveniently useful in a variety of applications. As a result of having earnestly examined existing small-sized utility vehicles, the present inventors have determined that more effective use can be made of a space behind a driver seat and a passenger seat in a small-sized utility vehicle by accommodating a power unit in a space below the driver seat and the passenger seat. Further, an aspect of presently preferred embodiments is to make an engine of a small-sized utility vehicle a multi-cylinder engine in order to improve performance.

Typically, the space below a driver seat and a passenger seat in a small-sized utility vehicle is not large enough in height or planar area to permit a typical power unit to be arranged therein. Therefore, if a typical power unit was positioned below the driver and passenger seat of a typical utility vehicle, a part of the engine and transmission assembly would protrude from a space below the driver seat and the passenger seat. In the light of such a situation, the present inventors have developed a power unit that is capable of being accommodated in a space below a driver seat and a passenger seat in a small-sized utility vehicle.

A power unit having certain features, aspects and advantages of one or more embodiments of the invention is described below. Moreover, the invention is not limited to the following embodiments. In the drawings, members or portions having the same, or substantially the same function are denoted by the same reference numerals.

A power unit 100 can be arranged in a space below a driver seat 200 and a passenger seat 300 in, for example, a small-sized utility vehicle 1000 as shown in FIGS. 1 to 4. The power unit 100 includes an engine 11 and a transmission assembly 12 as shown in FIG. 5.

The engine 11 includes a crank shaft 22 having weights 21 (referred to herein as "counterweights") as shown in FIG. 5. The engine 11 includes connecting rods 23, pistons 24, and cylinders 25, 26. The connecting rods 23 are connected to the crank shaft 22 and have the pistons 24 connected to ends thereof. The cylinders 25, 26 support the pistons 24 connected to the connecting rods 23 to enable the same to reciprocate.

As shown in FIG. 5, the crank shaft 22 includes crank webs 27 and crank pins 28, by which the connecting rods 23 are mounted. The counterweights 21 are members or portions of the crank shaft 22 that generate an inertial force to smooth the rotation of the crank shaft 22, and are located generally opposite the pins 28 on the crank web 27. In the illustrated arrangement, the counterweights 21 are secured to or formed on the crank webs 27 of the crank shaft 22 to serve as counterweights to the mass of the pistons 24 and/or other moving or reciprocating components or members. Although the weights 21 are shown as counterweight portions of the crank shaft 22, the weights 21 are not limited to such. The weights 21 or counterweights may also be any type of a rotational mass coupled directly or indirectly to the crank shaft 22, such as a flywheel, for instance. Thus, the counterweight does not necessarily counteract any specific mass of the engine 11, but rather may generally counteract masses or forces acting on the crank shaft 22 to smooth the rotation of the crankshaft.

As shown in FIG. 5, the illustrated power unit 100 includes the two cylinders 25, 26 and is a so-called horizontally-opposed engine, in which the cylinders 25, 26 are opposed to each other with the crank shaft 22 therebetween. With the power unit 100, axes of the cylinders 25, 26 are arranged substantially horizontal (90 degrees to the vertical described above) when the power unit 100 is arranged within a vehicle so that the crank shaft 22 is substantially horizontal. With such construction, the power unit 100 can be restricted to be low in height. Also, vibrations of the engine can be decreased by the constitution of the horizontally-opposed engine.

As shown in FIG. 6, the transmission assembly (or transmission mechanism) 12 is connected to the crank shaft 22 through a first transmission mechanism 35.

The first transmission mechanism 35 includes a centrifugal clutch 41 mounted to the crank shaft 22, a speed change operating clutch 42 mounted to a first drive shaft 31 of the transmission assembly 12, and a second transmission mechanism 43 coupling an output portion of the centrifugal clutch 41 and an input portion of the speed change operating clutch 42. In the illustrated arrangement, the second transmission mechanism 43 involves meshing of the output gear 44 provided on the output portion of the centrifugal clutch 41 and an input gear 45 provided on the input portion of the speed change operating clutch 42. Also, according to the illustrated embodiment, the centrifugal clutch 41 and the speed change operating clutch 42 are positionally offset to each other in an axial direction of the crank shaft 22 and the drive shaft 31. Thereby, the power unit 100 can be made compact in the axial direction of the crank shaft 22 and arranged with a relatively small distance between the drive shaft 31 and the crank shaft 22.

Also, according to the illustrated embodiment, the transmission assembly 12 includes the first drive shaft 31, a first driven shaft 32, a second drive shaft 33, and a second driven shaft 34. The first drive shaft 31 is connected to the crank shaft 22 through the first transmission mechanism 35 and includes a first drive gear 36. The first driven shaft 32 includes a first driven gear 37, which meshes with the first drive gear 36. The second drive shaft 33 is connected to the first driven shaft 32 through a shaft connecting element 51 to extend coaxially relative to the first driven shaft 32. Also, the second drive shaft 33 includes a second drive gear 38. Also, the second driven shaft 34 includes a second driven gear 39, which meshes with the second drive gear 38.

The respective drive gears 36, 38 and the driven gears 37, 39 are mounted to respective shafts to be fixed thereto by a fastening arrangement, such as a splined connection, or the like. In addition, the shaft connecting element 51 comprises splines formed on shaft ends of the first driven shaft 32 and the second drive shaft 33, and the first driven shaft 32 and the second drive shaft 33 are connected to each other by a sleeve 52, which is formed on an inner peripheral surface thereof with a spline that mates with the splines of the first driven shaft 32 and the second drive shaft 33. In addition, mounting of the respective drive gears 36, 38 and the driven gears 37, 39 to the respective shafts and the shaft connecting element 51 are not limited to the embodiment described above, but may employ other suitable coupling mechanisms as well. The transmission assembly 12 is made compact as a whole by having the first driven shaft 32 and the second drive shaft 33 are connected to each other by the shaft connecting element 51.

Also, while a depiction is omitted, the transmission assembly 12 is switched in forward travel, backward travel, and speed change ratio by changing the relative, positional relationship of the drive gears 36, 38 and the driven gears 37, 39. With such transmission assembly 12, a sub-transmission mechanism is provided between the first drive shaft 31 and the first driven shaft 32 and a main-transmission mechanism is provided between the second drive shaft 33 and the second driven shaft 34. The two transmission mechanisms make switching in forward travel, backward travel, HI gear, and LOW gear and a fine change in speed change ratio. The second driven shaft 34 is connected to an output shaft 48 of the power unit 100 through gears 46, 47.

In the illustrated embodiment, as shown in FIG. 6, the first drive shaft 31, the first driven shaft 32, the second drive shaft 33, and the second driven shaft 34, respectively, are arranged in parallel to the crank shaft 22. The first driven shaft 32 and the second drive shaft 33 are connected axially to each other.

With the power unit 100, as shown in FIG. 5, the transmission assembly 12 is at least partially disposed inside a region B that extends vertically below the crank shaft 22 and, more specifically, in a region B that extends below a swept area A of the counterweights 21 when the power unit 100 is arranged within a vehicle such that the crank shaft 22 is substantially horizontal.

More specifically, according to the embodiment, the counterweights 21 are mounted as counterweights to the crank webs 27 as shown in FIG. 5. In this case, the counterweights 21 are varied in position upon rotation of the crank shaft 22 as viewed axially of the crank shaft 22. Therefore, a region B vertically below a turning locus A of the crank shaft 22 including the counterweights 21 is preferably taken account of as "region vertically below the crank shaft including the weights". The outside diameter of the turning locus A is prescribed by a maximum outside diameter of the crank shaft 22 including the counterweights 21. The area A is also referred to as a "swept" area of the counterweights 21.

With the power unit 100, the drive shafts 31, 33 including the drive gears 36, 38, or the driven shafts 32, 34 including the driven gears 37, 39 are at least partially disposed inside the region B vertically below the crank shaft 22 including the counterweights 21 when the power unit 100 is arranged so that the crank shaft 22 is substantially horizontal.

Herein, "the drive shafts including the drive gears" takes account of all drive gears in the event that the drive shafts include a plurality of drive gears. Also, "the driven shafts including the driven gears" takes account of all driven gears in the event that the driven shafts include a plurality of drive gears.

The power unit 100 is constructed such that the transmission assembly 12 is disposed inside the region B vertically below the crank shaft 22 including the counterweights 21. The case where the transmission assembly 12 is not at least partially disposed inside the region B vertically below the crank shaft 22 including the counterweights 21 means, in other words, the case where the crank shaft 22 and the transmission assembly 12 do not overlap each other as viewed in plan view when the power unit 100 is arranged so that the crank shaft 22 is substantially horizontal, so that the power unit 100 is not made compact as viewed in the plan view.

Like the power unit 100 according to the embodiment described above, in the case where the transmission assembly 12 is at least partially disposed inside the vertically lower region B described above when the power unit 100 is arranged so that the crank shaft 22 is substantially horizontal, the crank shaft 22 and the transmission assembly 12 overlap each other as shown in FIG. 7, so that the power unit 100 is made compact as viewed in the plan view.

With the transmission assembly 12 at least partially disposed inside the region B vertically below the crank shaft 22 including the counterweights 21 when the power unit 100 is arranged so that the crank shaft 22 is substantially horizontal includes arrangements where the drive shafts 31, 33 including the drive gears 36, 38, or the driven shafts 32, 34 including the driven gears 37, 39 are at least partially disposed inside the vertically lower region B like, for example, the embodiment described above.

That is, in the event that the drive shaft 31 is arranged in the vertically lower region B as shown in, for example, FIG. 5, the driven shaft 32 connected to the drive shaft 31 is connected with the driven gear 37 in mesh with the drive gear 36. Therefore, a region in which the driven shaft 32 is arranged is limited by a position in which the drive shaft 31 is arranged. Therefore, when the drive shaft 31 including the drive gear 36, or the driven shaft 32 including the driven gear 37 is at least partially disposed inside the vertically lower region B described above, the power unit 100 is made compact as viewed in plan view as compared with what would otherwise be the case.

In addition, in the event that the power unit 100 is arranged as shown in FIGS. 5 and 7 so that the crank shaft 22 is substantially horizontal, the first drive shaft 31 including the first drive gear 36 is disposed inside the region B vertically below the crank shaft 22. The first driven shaft 32 including the first driven gear 37 and the second drive shaft 33 including the second drive gear 38 are substantially disposed inside the region B vertically below the crank shaft 22 while they partially protrude from the region B. In this manner, in the event that the power unit 100 is arranged so that the crank shaft 22 is made horizontal, additional drive shafts including drive gears, or additional driven shafts including driven gears may be at least partially disposed inside the region B vertically below the crank shaft 22 described above. Thereby, the power unit 100 is made further compact as viewed in plan view as shown in FIG. 7.

Furthermore, in the event that the power unit 100 is arranged as shown in FIG. 5 so that the crank shaft 22 is substantially horizontal, the drive shafts 31, 33, or the driven shafts 32, 34 are arranged so that shaft portions thereof except the drive gears 36, 38, or the driven gears 37, 39 do not overlap in a vertical direction. Therefore, the power unit 100 is compact in the vertical direction.

In this manner, when the power unit 100 is arranged as shown in FIGS. 5 and 7 so that the crank shaft 22 is substantially horizontal, the power unit 100 is compact in the vertical direction and as viewed in plan view. Therefore, for example, by arranging axes of the cylinders 25, 26 in a width direction of a vehicle with the transmission assembly 12 disposed below the engine 11 and with the crank shaft 22 in a longitudinal direction of a vehicle as shown in FIGS. 1 to 4, the power unit 100 can be accommodated in a space below the driver seat 200 and the passenger seat 300 of the small-sized utility vehicle 1000. In particular, according to the illustrated embodiment, the power unit 100 is constructed to be compact in an axial direction of the crank shaft 22. Therefore, the power unit 100 can be accommodated in a space below the driver seat 200 and the passenger seat 300 as shown in FIG. 3 so that the power unit 100 does not protrude much rearwardly of the driver seat 200 and the passenger seat 300. Therefore, effective use can be made of the space disposed rearwardly of the driver seat 200 and the passenger seat 300 of the small-sized utility vehicle 1000.

In addition, in an example of the arrangement shown in FIGS. 1 to 4, the power unit 100 is arranged a little toward the passenger seat 300 relative to a center in the space below the driver seat 200 and the passenger seat 300 of the small-sized utility vehicle 1000. An intake accumulator 401 (plenum chamber or air cleaner box) is mounted in a space covered by a cover 402 between the driver seat 200 and the passenger seat 300 of the small-sized utility vehicle 1000. Also, a fuel tank 403 is mounted in an empty space toward the driver seat 200 in the space below the driver seat 200 and the passenger seat 300. In this manner, with the small-sized utility vehicle 1000, effective use can be made of a space disposed rearwardly of the driver seat 200 and the passenger seat 300 by changing the construction of the power unit 100 and an arrangement of the intake accumulator 401 and the fuel tank 403.

While a preferred embodiment of the power unit has been described, the power unit according to the invention is not limited to the embodiment described above. For example, the construction of the engine, the construction of the transmission mechanism, etc. are only exemplary and are susceptible to various modifications.

For example, the counterweights 21 serve as locations/members functioning as counterweights for the crank shaft. The embodiment illustrates the counterweights 21 formed on the crank webs 27, but is not limited thereto. The counterweights 21 may be formed integral with the crank shaft, or a separate member from the crank shaft may be mounted to the crank shaft (such as a flywheel, for example). Also, the weights may be arranged in a location other than the crank webs of the crank shaft 22.

Also, the embodiment illustrates only an example of the first transmission mechanism 35 for connection of the crank shaft 22 and the transmission assembly 12 and the embodiment described above is not limitative.

When the relative, positional relationship of the drive shaft and the driven shaft with the crank shaft 22 is to be determined, it is determined in a state, in which the power unit 100 is arranged so that the crank shaft 22 is substantially horizontal. That is, "the power unit 100 is arranged so that the crank shaft 22 is substantially horizontal" specifies a posture of the power unit 100 when the relative, positional relationship of the drive shafts 31, 33 and the driven shafts 32, 34 with the crank shaft 22 is to be determined. When the power unit 100 is to be mounted on a vehicle, it is not required that the power unit 100 be arranged so that the crank shaft 22 is made horizontal.

Also, as described above, in the case where the power unit is arranged so that the crank shaft is substantially horizontal, it suffices that the transmission mechanism on the power unit be at least partially disposed inside the region vertically below the crank shaft described above. For example, in the case where the transmission mechanism includes a drive shaft having a drive gear and a driven shaft connected to the drive shaft through a driven gear, which meshes with the drive gear as shown in FIG. 8, preferably, drive shafts 31a having a drive gear 36a, or driven shafts 32a having a driven gear 37a are at least partially disposed inside the region B vertically below the crank shaft 22 described above. Accordingly, all parts of the drive shafts 31a having the drive gear 36a or all parts of the driven shafts 32a having the driven gear 37a may be not necessarily disposed inside the region B vertically below the crank shaft 22. In addition, A in FIG. 8 denotes a turning locus or swept area of the crank shaft 22 including the counterweights 21.

Also, with either of the drive shafts 31a and the driven shafts 32a, it suffices that the drive shafts 31a having the drive gear 36a or the driven shafts 32a having the driven gear 37a be at least partially disposed inside the region B vertically below the crank shaft 22. Accordingly, the other of the shafts may not be arranged in the region B vertically below the crank shaft 22. For example, in FIG. 8, with the drive shafts 31a, the drive shafts 31a having the drive gear 36a are partially disposed inside the region B vertically below the crank shaft 22, but the driven shafts 32a having the driven gear 37a are not disposed inside the region B vertically below the crank shaft 22. The drive shaft and the driven shaft may be arranged in this manner.

Also, with respect to the matter that a drive shaft having a drive gear, or a driven shaft having a driven gear is at least partially disposed inside the region B vertically below the crank shaft 22, any one of the shafts is preferably taken account in the case where drive shafts and driven shafts are provided in plural as in the embodiments shown in FIGS. 5 and 6. With the one of the shafts, preferably, the shafts having the drive gears 36, 38, or the driven gears 37, 39 are at least partially disposed inside the region B vertically below the crank shaft 22 described above.

Also, in the case where the power unit 100 is arranged so that the crank shaft 22 is substantially horizontal, preferably, both the drive shafts 31, 33 having the drive gears 36, 38 and the driven shafts 32, 34 having the driven gears 37, 39 are at least partially disposed inside the region B vertically below the crank shaft 22 or the cylinder 25. More preferably, in the case where the power unit 100 is arranged so that the crank shaft 22 is made horizontal as shown in FIGS. 5 and 7, preferably, both the drive shafts 31, 33 having the drive gears 36, 38 and the driven shafts 32, 34 having the driven gears 37, 39 are at least partially disposed inside the region B vertically below the crank shaft 22.

In addition, in the case where the transmission assembly 12 includes a plurality of drive shafts and a plurality of driven shafts, additional drive shafts and driven shafts are preferably disposed inside the region B vertically below the crank shaft 22 or the cylinder 25 described above so that they do not overlap each other in the vertical direction. Thereby, the power unit 100 is made further compact in the vertical direction and as viewed in plan view as shown in FIG. 7. Such construction is adopted whereby it is possible to provide a power unit suited to arrangement below, for example, the driver seat 200 and the passenger seat 300 of the small-sized utility vehicle 1000.

In the illustrated embodiment, the power unit 100 is arranged so that the drive shafts 31, 33 and the driven shaft 32, 34 are arranged in parallel to the crank shaft 22 as shown in FIGS. 5 and 7. Taking into consideration an effect that the power unit 100 is made compact in the vertical direction, it is not necessarily required that the drive shafts 31, 33 and the driven shaft 32, 34 be made in parallel to the crank shaft 22.

Taking into consideration an effect that the power unit 100 is made compact in the vertical direction, the drive shafts 31, 33 and the driven shaft 32, 34 are preferably made perpendicular to the vertical described above. In other words, the drive shafts 31, 33 and the driven shaft 32, 34 are preferably arranged to be horizontal in the case where the power unit 100 is arranged so that the crank shaft 22 is arranged substantially horizontal. For example, the drive shafts 31, 33 and the driven shaft 32, 34 may be arranged in a positional relationship to be twisted relative to each other with the crank shaft 22.

Also, the embodiment described above illustrates a so-called horizontally-opposed engine, in which the power unit 100 includes the two cylinders 25 and the cylinders 25 are opposed to each other with the crank shaft 22 therebetween. The cylinders of the power unit 100 are not limited thereto. For example, in order to restrict the power unit 100 in height, axes of the cylinders 25 are preferably inclined to the vertical in the case where the power unit 100 is arranged so that the crank shaft 22 is made horizontal. That is, in this case, the power unit 100 is made compact in the vertical direction as compared with the case where axes of the cylinders 25 are not inclined to the vertical. Axes of the cylinders 25 are preferably inclined in the range of 45 to 90 degrees to the vertical, more preferably, axes of the cylinders 25 are preferably inclined in the range of 70 to 90 degrees to the vertical. Also, more preferably, axes of the cylinders 25 are preferably inclined in the range of 80 to 90 degrees to the vertical.

While the case where the number of cylinders is two has been illustrated, the number of cylinders may be two or more to provide multi-cylinders. Also, in the case where a power unit 100A is arranged so that a crank shaft 22 is made horizontal as shown in FIGS. 9 and 10, respective cylinders 25, 26 may be arranged on one side of the crank shaft 22 and the respective cylinders 25, 26 may be inclined in the range of 70 to 90 degrees to the vertical. Even in the case where the cylinders 25, 26 are arranged in this manner, it is possible restrict the power unit 100A in height. In addition, members/locations performing the same function as shown in FIGS. 5 to 7 are denoted by the same reference numerals, in FIGS. 9 and 10, in which the power unit 100A according to the modification is shown.

Also, the power unit according to the invention is compact as described above and widely applicable to other applications than a small-sized utility vehicle.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present power unit has been described in the context of particularly preferred embodiments, the skilled artisan will appreciate, in view of the present disclosure, that certain advantages, features and aspects of the power unit may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A power unit for a vehicle, comprising:
an engine, the engine comprising a crank shaft having at least one counterweight; and
a transmission assembly operatively coupled to the engine;
the transmission assembly comprising an output shaft that outputs power from the transmission assembly;
wherein, when the power unit is oriented such that the crank shaft is substantially horizontal, at least a portion of the transmission assembly is positioned within a region extending below a swept area of the at least one counterweight;
wherein the output shaft is positioned below the engine.

2. The power unit of claim 1, wherein the engine further comprises a connecting rod connected to the crank shaft, a piston connected to the connecting rod, and, at least one cylinder, which supports the piston for reciprocating movement, wherein an axis of the at least one cylinder is inclined from a vertical direction.

3. The power unit of claim 2, wherein the axis of the at least one cylinder is within the range of about 45 to 90 degrees from the vertical direction.

4. The power unit of claim 2, wherein the axis of the at least one cylinder is within the range of about 70 to 90 degrees from the vertical direction.

5. The power unit of claim 2, wherein the at least one cylinder comprises a first cylinder and a second cylinder, the first cylinder and the second cylinder are opposed to each other with the crank shaft therebetween, and the axes of the cylinders are substantially horizontal.

6. The power unit of claim 2, wherein the at least one cylinder comprises a first cylinder and a second cylinder, the first cylinder and the second cylinder are arranged on one side of the crank shaft, and the axes of the first and second cylinders are within the range of about 70 to 90 degrees from the vertical direction.

7. The power unit of claim 2, wherein the transmission assembly further comprises a drive shaft having a drive gear and being connected to the crank shaft through a first transmission mechanism, and a driven shaft connected to the drive shaft through a driven gear, which meshes with the drive gear, and wherein at least a portion of both the drive shaft and the driven shaft are positioned within at least one of the region extending below the swept area of the counterweight and a region extending below the cylinder.

8. The power unit of claim 1, wherein the transmission assembly further comprises a drive shaft having a drive gear and being connected to the crank shaft through a first transmission mechanism, and a driven shaft connected to the drive shaft through a driven gear, which meshes with the drive gear, and wherein a portion of at least one of the drive shaft and the driven shaft is positioned within a region extending below the swept area of the at least one counterweight.

9. The power unit of claim 8, wherein at least a portion of both the drive shaft and the driven shaft are positioned within a region extending below the swept area of the at least one counterweight.

10. The power unit of claim 8, wherein the drive shaft and the driven shaft are arranged substantially perpendicular to the vertical direction.

11. The power unit of claim 8, wherein the drive shaft and the driven shaft are arranged in parallel to the crank shaft.

12. The power unit of claim 8, wherein the first transmission mechanism comprises a centrifugal clutch mounted to the crank shaft, a speed change operating clutch mounted to the drive shaft, and a second transmission mechanism coupling an output portion of the centrifugal clutch and an input portion of the speed change operating clutch, and wherein the centrifugal clutch and the speed change operating clutch are offset from one another in an axial direction of the crank shaft.

13. The power unit of claim 1, wherein the at least one counterweight is a portion of a web of the crank shaft.

14. The power unit of claim 13, wherein the counterweight portion of the web is located opposite a connecting rod pin supported by the web.

15. A power unit for a vehicle, comprising:
an engine, the engine comprising a crank shaft having at least one counterweight; and
a transmission assembly operatively coupled to the engine;
wherein, when the power unit is oriented such that the crank shaft is substantially horizontal, at least a portion of the transmission assembly is positioned within a region extending below a swept area of the at least one counterweight;

wherein the transmission assembly comprises:

a first drive shaft having a first drive gear and being connected to the crank shaft through a first transmission mechanism;

a first driven shaft including a first driven gear that meshes with the first drive gear;

a second drive shaft having a second drive gear and being coupled to the first driven shaft through a shaft coupling element such that the second drive shaft extends coaxially with respect to the first driven shaft;

a second driven shaft having a second driven gear that meshes with the second drive gear: and wherein at least one of the first drive shaft and the first driven shaft and the second drive shaft and the second driven shaft, are positioned within a region extending below the swept area of the at least one counterweight.

16. A power unit for a vehicle, comprising:

an engine, the engine comprising a crank shaft;

a rotating mass fixed for rotation with the crank shaft; and a transmission assembly operatively coupled to the engine;

the transmission assembly comprising an output shaft that outputs power from the transmission assembly;

wherein, when the power unit is oriented such that the crank shaft is substantially horizontal, at least a portion of the transmission assembly is positioned within a region extending below a swept area of the rotating mass;

wherein the output shaft is positioned below the engine.

17. The power unit of claim 16, wherein the engine further comprises a connecting rod connected to the crank shaft, a piston connected to the connecting rod, and at least one cylinder, which supports the piston for reciprocating movement, wherein the axis of the at least one cylinder is within the range of about 45 to 90 degrees from the vertical direction.

18. The power unit of claim 17, wherein the axis of the at least one cylinder is within the range of about 70 to 90 degrees from the vertical direction.

19. The power unit of claim 17, wherein the at least one cylinder comprises a first cylinder and a second cylinder, the first cylinder and the second cylinder are opposed to each other with the crank shaft therebetween, and the axes of the cylinders are substantially horizontal.

20. The power unit of claim 17, wherein the at least one cylinder comprises a first cylinder and a second cylinder, the first cylinder and the second cylinder are arranged on one side of the crank shaft, and the axes of the first and second cylinders are within the range of about 70 to 90 degrees from the vertical direction.

* * * * *